UNITED STATES PATENT OFFICE.

MARC PIERRE EMMANUEL LÉTANG, OF PARIS, FRANCE.

PROCESS OF GENERATING ACETYLENE GAS FROM CARBID OF CALCIUM.

SPECIFICATION forming part of Letters Patent No. 659,448, dated October 9, 1900.

Original application filed December 13, 1897, Serial No. 661,714. Divided and this application filed March 19, 1900. Serial No. 9,179. (No specimens.)

*To all whom it may concern:*

Be it known that I, MARC PIERRE EMMANUEL LÉTANG, of Paris, France, have invented an Improvement in Processes for the Generation of Acetylene Gas from Carbid of Calcium, of which the following is a specification.

My invention relates to an improved process for the generation of acetylene from carbid of calcium; and it consists of certain improvements which are fully set forth in the following specification.

This invention has been patented to me in Great Britain by Letters Patent No. 21,572, dated September 29, 1896.

Common carbid of calcium has the defect of being very sensitive to the action of dampness or of steam. Moreover, it leaves as a residuum a layer of damp and solid lime which cannot pass through the openings of the carbid-supporting receptacles of the acetylene-producing apparatus. These two defects result in keeping up the evolution of the gas long after the carbid ceases to be in direct contact with the water.

It is the object of my invention to overcome these defects, either or both, as may be desired, by freeing the carbid of its lime residuum and by rendering the carbid less sensitive to moisture. The first result is attained by subjecting the carbid to water in the generation of acetylene in connection with a substance which dissolves the lime as it is produced and enables it to pass off. The second result is obtained by treating the carbid with a substance which protects it from the action of moisture. This may be employed when desired to retard the generation of the gas to any desired degree, so that a more uniform generation may be obtained.

In carrying out my invention I prefer to proceed in the following manner: I cover the pieces of carbid with a protective coating or paint consisting chiefly of glucose, to which I add petroleum and carbonate of lime in powder. The following is the formula for the paint which I prefer to use: glucose, fifty-five parts; petroleum, five parts, and carbonate of lime in powder, forty parts. This formula may be modified not only as regards the relative proportions of the ingredients, but also as regards their nature. Thus instead of glucose to dissolve the lime I may use any other chemical capable of dissolving or liquefying lime—for instance, sugar in either a crude or refined state, or the residuum from the manufacture of sugar and from distilleries, lactose, honey, molasses, mannite, maltose, dextrine, and the like, as well as mixtures and combinations of sugar together or with other substances—in short, all saccharine substances, such as saccharate and sucrates. On the other hand, for petroleum, the use of which is to preserve the carbid from the action of steam or moisture, I may substitute vaseline, terebinth, heavy oils of tar, turpentine, varnish made with shellac, with caoutchouc, with rosin, with india-rubber, or with gutta-percha, or the like—in short, every other chemical capable of forming an impermeable coating. The powdered carbonate of lime, which is of secondary importance in the mixture, may be replaced by chalk, talc, sulfur, fine sand, and the like. If desired, it may be omitted. This coating may be applied to the calcic carbid in any manner found most convenient. For instance, each piece may be dipped in or washed with the compound coating, or where the pieces are small they may be joined or pressed into a conglomerate mass with the compound coating or may be coated after being made into such conglomerate mass.

Instead of covering the carbid with the paint or coating it may be merely mixed (after petroleum has been added thereto) with one or more of the above substances, which are capable of dissolving or liquefying the lime. These substances may be merely dissolved in water.

My improvements are applicable to calcic carbid even where the same contains other substances, such as magnesium or a magnesium salt. Hence I do not limit the invention in its application to pure carbid of calcium.

It is to be understood that, if desired, the glucose may be mixed with other substances, such as powder of crystallized sugar or other equivalent substance, and employed with or without acetic or other acid having the property of preventing the sugar becoming brittle. These ingredients may be used as follows: seventy parts of glucose, twenty-four parts of crystallized sugar, one part of acetic acid, and five parts of petroleum. To this may be added the powdered carbonate of lime, if necessary; but this may be omitted in view of the use of the crystallized sugar and acetic acid, which acts as a binder. Other proportions may be employed, if desired.

Where it is desired simply to secure the solubility of the lime, the petroleum or its equivalent is omitted.

While I prefer to make the coating complete as a mixture and apply all at once, it is nevertheless evident that the carbid may be dipped in the petroleum first and subsequently coated with the solvent for lime.

My invention prevents continued generation of gas after the gas-valve has been closed and contact with water prevented, and thus overcomes the great objections and dangers heretofore experienced in small generators and lamps, due to the presence of considerable moisture in the damp lime inclosing the carbid, which in time generates gas by decomposing the carbid when no gas is being consumed and when no outlet is provided. In case a safety-valve is provided then, while the danger ceases, the loss of carbid still results. With my invention this is obviated, since the damp lime is dissolved by the glucose and leaves the carbid as soon as formed. In this manner the soluble lime freely flows through the meshes of the basket or cage of the carbid-holder and automatically eliminates itself from the remaining carbid of calcium. The petroleum or oil coating of the carbid does not prevent direct action of water, but largely prevents the decomposition due to moisture, as in steam or light vapor, and consequently it plays an important function in acetylene-generating machines and lamps, where the same are run at intervals.

Carbid treated in the manner herein set out has the quality of retarding to a satisfactory degree the generation of acetylene gas, so that the generation of such gas is more uniformly produced and sudden variations in pressures obviated. This in small lamps is a great advantage, since it secures a more steady flame, constant candle-power, and more uniform pressure.

As far as I am aware the treatment of carbid of calcium with a coating either for rendering the lime solvent or for arresting the generation of gas by action of moisture or vapor separately or in conjunction was not known prior to my invention. Hence I do not confine myself to the special means of securing those ends herein set out, as any means for securing these results would be within the spirit of my invention.

In this application I do not claim the carbid of calcium coated or prepared in the manner prescribed as an article of manufacture or commerce, as that forms the subject-matter of my application, Serial No. 661,714, filed December 13, 1897, of which this application is a division.

What I claim as new, and desire to secure by Letters Patent, is—

1. The method of generating acetylene gas in a uniform manner which consists in treating carbid of calcium with water to decompose the carbid and produce acetylene gas and lime, and simultaneously therewith subjecting the lime to the action of a substance which is a solvent in the presence of moisture to render the lime soluble or fluid whereby it may flow by gravity away from the undecomposed carbid.

2. The method of generating acetylene gas which consists in first treating carbid of calcium with a substance more or less impervious to moisture and also with a substance which is a solvent for lime when in moist condition, and in the presence of and contact with said substances subjecting the carbid of calcium to the action of water whereby the said action of the water in decomposing the carbid of calcium is retarded and the moist lime produced is rendered soluble and removed by the action of gravity substantially as quickly as formed and abnormal generation of gas avoided.

3. The method of generating acetylene gas which consists in simultaneously subjecting carbid of calcium and glucose or its equivalent to the action of water.

4. The method of generating acetylene gas and forming a soluble residue which consists in treating carbid of calcium with water in connection with a substance, which by double decomposition forms acetylene gas and a residue soluble in water.

5. The method of producing acetylene gas which consists in subjecting calcium carbid to the action of water, and treating the spent carbid or lime with a proportioned quantity of a carbohydrate in the presence of water whereby a soluble product is formed therefrom and dissolved away from the untreated carbid.

In testimony of which invention I have hereunto set my hand.

MARC PIERRE EMMANUEL LÉTANG.

Witnesses:
EDWARD P. MACLEAN,
GEORGE E. LIGHT.